United States Patent
Iwayasu

(10) Patent No.: US 10,355,279 B2
(45) Date of Patent: Jul. 16, 2019

(54) NEGATIVE ELECTRODE MATERIAL FOR LITHIUM ION SECONDARY BATTERIES, NEGATIVE ELECTRODE FOR LITHIUM ION SECONDARY BATTERIES USING SAME, LITHIUM ION SECONDARY BATTERY AND BATTERY SYSTEM

(71) Applicant: HITACHI, LTD., Tokyo (JP)

(72) Inventor: Norio Iwayasu, Tokyo (JP)

(73) Assignee: HITACHI, LTD., Tokyo (JP)

(*) Notice: Subject to any disclaimer, the term of this patent is extended or adjusted under 35 U.S.C. 154(b) by 483 days.

(21) Appl. No.: 15/022,819

(22) PCT Filed: Oct. 10, 2013

(86) PCT No.: PCT/JP2013/077569
§ 371 (c)(1),
(2) Date: Mar. 17, 2016

(87) PCT Pub. No.: WO2015/052809
PCT Pub. Date: Apr. 16, 2015

(65) Prior Publication Data
US 2016/0211521 A1     Jul. 21, 2016

(51) Int. Cl.
*H01M 4/62* (2006.01)
*H01M 4/131* (2010.01)
(Continued)

(52) U.S. Cl.
CPC .............. *H01M 4/62* (2013.01); *C08F 12/30* (2013.01); *C08F 212/14* (2013.01);
(Continued)

(58) Field of Classification Search
CPC ........ H01M 4/62; H01M 4/131; H01M 4/134; H01M 4/366; H01M 4/386; H01M 4/483;
(Continued)

(56) References Cited

U.S. PATENT DOCUMENTS

2004/0041536 A1* 3/2004 Matsubara .......... H01M 4/0404
320/106
2009/0280409 A1  11/2009 Mogi et al.
(Continued)

FOREIGN PATENT DOCUMENTS

JP    2008-210618 A    9/2008
JP    2010518581 A    5/2010
(Continued)

OTHER PUBLICATIONS

Japanese Office Action for Japanese Patent Application No. 2015-541378 dated Nov. 21, 2016 (with English translation).

*Primary Examiner* — Jimmy Vo
(74) *Attorney, Agent, or Firm* — Volpe and Koenig, P.C.

(57) ABSTRACT

A negative electrode material, for lithium ion secondary batteries, that has a high Li ion conductivity and improves the lithium ion secondary batteries in cycle characteristic. The negative electrode material includes: a negative electrode active material including silicon and/or a silicon compound; and a polymer represented by a chemical formula (1):

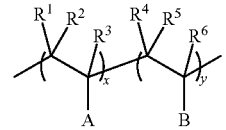

wherein: A is a functional group having an amide group (—CONH—) and a sulfo group (~SO3X); X represents an alkali metal or hydrogen (H); B is a functional group having a polar functional group; R1 to R6 are each a hydrocarbon group having 1 to 10 carbon atoms or hydrogen (H); x and
(Continued)

y are composition proportions, respectively, in the polymer that is a copolymer, and satisfies $0<x(x+y)\leq 1$.

15 Claims, 1 Drawing Sheet

(51) Int. Cl.
*H01M 4/134* (2010.01)
*H01M 4/36* (2006.01)
*H01M 10/42* (2006.01)
*C08F 12/30* (2006.01)
*C08F 212/14* (2006.01)
*H01M 4/48* (2010.01)
*H01M 10/0525* (2010.01)
*H01M 4/02* (2006.01)
*H01M 4/38* (2006.01)

(52) U.S. Cl.
CPC ........... *H01M 4/131* (2013.01); *H01M 4/134* (2013.01); *H01M 4/366* (2013.01); *H01M 10/4235* (2013.01); *H01M 4/386* (2013.01); *H01M 4/483* (2013.01); *H01M 4/625* (2013.01); *H01M 10/0525* (2013.01); *H01M 2004/027* (2013.01); *H01M 2220/20* (2013.01); *H01M 2220/30* (2013.01)

(58) Field of Classification Search
CPC ............. H01M 4/625; H01M 10/4235; H01M 10/0525
See application file for complete search history.

(56) References Cited

U.S. PATENT DOCUMENTS

| | | |
|---|---|---|
| 2010/0173196 A1 | 7/2010 | Itou et al. |
| 2013/0316235 A1 | 11/2013 | Yasuda et al. |
| 2014/0079995 A1 | 3/2014 | Wakada |

FOREIGN PATENT DOCUMENTS

| | | |
|---|---|---|
| JP | 2012-074167 A | 4/2012 |
| JP | 2013-012357 A | 1/2013 |
| JP | 2013-191485 A | 9/2013 |
| JP | 2013-197069 A | 9/2013 |
| WO | 2007/072948 A1 | 6/2007 |
| WO | 2007/088979 A1 | 8/2007 |
| WO | 2008097723 A1 | 8/2008 |
| WO | 2011/024789 A1 | 3/2011 |
| WO | 2012/111564 A1 | 8/2012 |
| WO | 2012/165422 A1 | 12/2012 |

\* cited by examiner

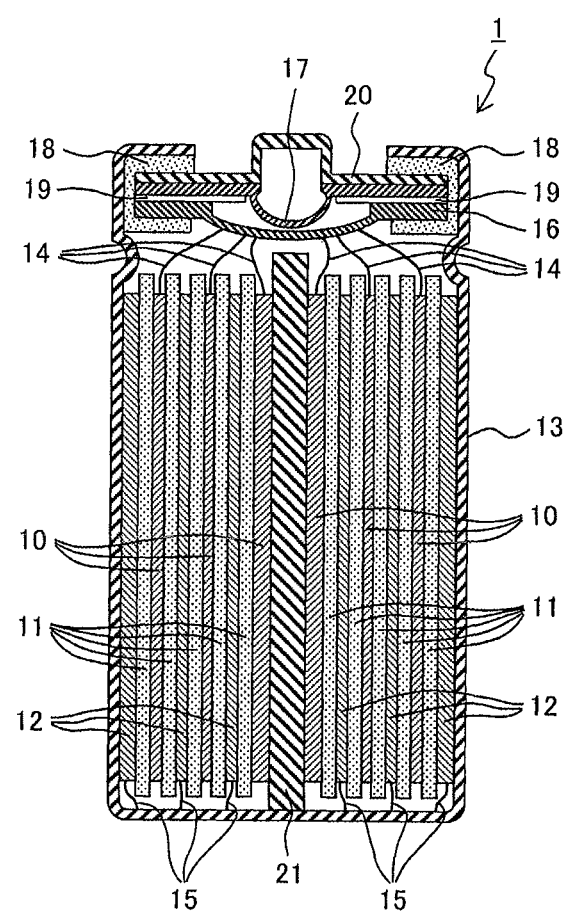

NEGATIVE ELECTRODE MATERIAL FOR LITHIUM ION SECONDARY BATTERIES, NEGATIVE ELECTRODE FOR LITHIUM ION SECONDARY BATTERIES USING SAME, LITHIUM ION SECONDARY BATTERY AND BATTERY SYSTEM

TECHNICAL FIELD

The present invention relates to a negative electrode material for lithium ion secondary batteries, a negative electrode for lithium ion secondary batteries using the same, a lithium ion secondary battery, and a battery system.

BACKGROUND ART

Lithium ion secondary batteries (referred to also as "Li batteries" hereinafter) have a high energy density to be used for mobile instruments such as portable telephones. Moreover, by making use of properties thereof, the development of large-sized batteries, for example, for being mounted in cars has also been advanced. In the meantime, Li batteries have various themes. Among these themes, an important theme is to heighten the capacity of the batteries. In recent years, about mobiles instruments, smartphones increase rapidly. Smartphones are large in electric power consumption to be usable only in a short period under the present circumstances. It is therefore essential to heighten the batteries in capacity. Furthermore, about large-sized batteries for being mounted in cars and others, the distance that the batteries can cause the cars and the others to run is short; thus, in order to make this distance longer, high-capacity batteries are required as well.

For an increase in the capacity of Li batteries, the development of high-capacity materials has been advanced. About a negative electrode of a Li battery, attention has been paid to negative electrode active material (negative electrode material) in which silicon (Si) is used. Si has a theoretical capacity of 4200 mAh/g, which is 10 or more times larger than that of carbon, which has been mainly used at present; thus, Si is expected as a high-capacity material. Additionally, the following have been paid as capacity-heightened materials: $SiO_x$, which is produced by mixing Si with silicon dioxide ($SiO_2$), and $SiO_x$-carbon-complexed-material ($SiO_xC$), in which $SiO_x$ is covered with carbon.

However, these Si based negative electrode active materials are high in capacity while the materials have a room for a further improvement of cycle characteristic in accordance with a high-level request. Thus, a technique is developed in which fluorinated ethylene carbonate (FEC) is added to an electrolytic solution to improve the cycle characteristic of a Si based negative electrode active material (Patent Literature 1). By the addition of FFC, a covering layer is formed on a negative electrode, this layer having an ion conductivity and further blocking the electrolytic solution. The formation of the covering layer would produce the following advantage: the co-insertion of a solvent is prevented, the insertion being generated when the negative electrode occludes Li, and the Si based negative electrode active material is heightened in structural stability, so that the cycle characteristic is improved.

CITATION LIST

Patent Literature

PTL 1: Japanese Patent Application Laid-Open No. 2008-210618

SUMMARY OF INVENTION

Technical Problem

However, as described in Patent Literature 1 listed above, the addition of an additive such as FEC into an electrolytic solution may raise the resistance of the battery. This raise would be caused by a matter that the covering film formed by FEC is relatively low in Li ion conductivity. It has been therefore necessary to develop a technique of covering a negative electrode active material with a covering film having a higher Li ion conductivity in order that the battery can be restrained from being raised in resistance while the battery has a high cycle characteristic.

In light of the above-mentioned actual situation, the present invention has been made, and provides a novel negative electrode material, for lithium ion secondary batteries, that has a high Li ion conductivity to make it possible to improve the lithium ion secondary batteries in cycle characteristic.

Solution to Problem

In order to attain the object, an aspect of the present invention provides a negative electrode material, for lithium ion secondary batteries, comprising: a negative electrode active material comprising silicon and/or a silicon compound; and a polymer represented by the following chemical formula (1):

[Chem. 1]

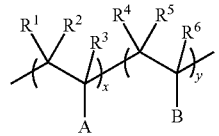

chemical formula (1)

In the chemical formula (1), A is a functional group having an amide group (—CONH—) and a sulfo group (—$SO_3$X wherein X represents an alkali metal or hydrogen (H)); B is a functional group having a polar functional group; $R^1$ to $R^6$ are each a hydrocarbon group having 1 to 10 carbon atoms or hydrogen (H); x and y are composition proportions in the polymer that is a copolymer, and satisfy the following: $0<x/(x+y)\leq 1$.

Advantageous Effects of Invention

The present invention makes it possible to provide a novel negative electrode material for lithium ion secondary batteries which has a high Li ion conductivity and which is capable of improving the cycle characteristic of the lithium ion secondary batteries.

BRIEF DESCRIPTION OF DRAWING

FIG. 1 is a schematic sectional view illustrating an example of a lithium ion secondary battery according to the present invention.

DESCRIPTION OF EMBODIMENTS

Another aspect of the present invention provides a negative electrode, for lithium ion secondary batteries, including:

a negative electrode material including a negative electrode active material; a binder; and a power collector; in which the negative electrode active material includes silicon, and/or a silicon compound; and the negative electrode material includes a polymer represented by the above-mentioned chemical formula (1).

Still another aspect of the present invention provides a lithium ion secondary battery including: a positive electrode; a negative electrode; and a nonaqueous electrolytic solution including a nonaqueous solvent and a support salt; in which the negative electrode includes a negative electrode material including a negative electrode active material; the negative electrode active material includes silicon and/or a silicon compound; and the negative electrode material includes a polymer represented by the above-mentioned chemical formula (1).

A further aspect of the present invention is a battery system, in which the above-mentioned lithium ion secondary battery is used.

Hereinafter, the aspects of the present invention and embodiments thereof will be more specifically described. However, the description made below demonstrates specific examples of the content of the invention. Thus, the invention is not limited by the description. The aspects or the embodiments may be variously changed and modified by those skilled in the art within the range of a technical conception disclosed in the present specification. Moreover, in possible drawings referred to for describing the invention, the same symbol is attached to members having the same function. Any repeated description thereabout may be omitted.

<Battery Structure of Lithium Ion Secondary Battery>

FIG. 1 is a schematic sectional view illustrating an example of a lithium ion secondary battery according to the present invention. As illustrated in FIG. 1, a battery 1 is configured to have positive electrodes 10, separators 11, negative electrodes 12, a battery container (that is, a battery can) 13, positive electrode power-collecting tabs 14, negative electrode power-collecting tabs 15, an internal lid 16, an internal pressure opening valve 17, a gasket 18, a positive temperature coefficient (PTC) resistor 19, a battery lid 20, and an axial core 21. The battery lid 20 is an integrated member composed of the internal lid 16, the internal pressure opening valve 17, the gasket 18, and the PTC resistor 19. The positive electrodes 10, the separators 11 and the negative electrodes 12 are wound around the axial core 21.

Each of the separators 11 is inserted between any one of the positive electrodes 10 and the corresponding negative electrode 12, and the resultant is wound around the axial core 21. In this way, each of battery electrode groups is produced. The axial core 21 may be any known axial core as far as the axial core can carry the positive electrodes 10, the separators 11 and the negative electrodes 12. The battery groups can be made into various shapes or forms besides a cylindrical shape illustrated in FIG. 1, the shapes or forms being, for example, such a form that rectangular electrodes are stacked onto each other, or such a form that the positive electrodes 10 and the negative electrodes 12 are wound into a flat form or any other shape or form. The shape of the battery container 13 may be selected from a cylindrical shape, a flatly long-circular shape, a flatly elliptical shape, a rectangular shape, and other shapes in accordance with the shape or form of the electrode groups.

The material of the battery container 13 is selected from aluminum, stainless steel, nickel-plated steel, and any other material anticorrosive against a nonaqueous electrolyte. When the battery container 13 is electrically connected to the positive electrodes 10 or the negative electrodes 12, the material of the battery container 13 is selected not to be denatured, at a region of the material that is in contact with the nonaqueous electrolyte, by the corrosion of the battery container 13 or the alloying of the material with lithium ions.

The electrode groups are put into the battery container 13. The negative electrode power-collecting tabs 15 are connected to the internal wall of the battery container 13, and the positive electrode power-collecting tabs 14 are connected to the bottom surface of the battery lid 20. The electrolytic solution is injected into the battery container 13 before an airtight sealing of the battery is attained. The method for injecting the electrolytic solution may be a method of adding the solution directly into the electrode groups in the state that the battery container is not closed with the battery lid 20, or a method of adding the solution through one or more injecting ports (not illustrated) made in the battery lid 20.

Thereafter, the battery lid 20 is brought into close contact with the battery container 13, and the whole of the battery is airtightly sealed. When the battery lid 20 has the injecting port(s), the port(s) is/are also airtightly sealed. In the method for sealing the battery airtightly, a known technique, such as welding or fastening, is usable.

The above has been described a case of the winding type electrode groups, in which each of the positive electrode, the corresponding negative electrode, and the separator for separating these electrodes from each other are wound. However, the structure of the lithium ion secondary battery according to the present invention is not limited to this structure. The electrode groups may each be a stacking type electrode group in which a positive electrode, a negative electrode and a separator are stacked onto each other.

<Negative Electrodes>

Each of the negative electrodes 12 includes a negative electrode material containing a negative electrode active material, a binder, and a power collector. As described above, in the present invention, the negative electrode material includes a negative electrode active material including silicon and/or a silicon compound, and a polymer represented by the above-mentioned chemical formula (1). Hereinafter, the negative electrode material according to the present invention will be detailed.

Negative Electrode Material:

(1) Negative Electrode Active Material

In the present invention, the selection of the negative electrode active material is important. In the invention, the negative electrode active material includes silicon (Si) and/or a Si compound (referred to also as "Si based negative electrode active material(s)" hereinafter). Si may be metallic Si (a simple substance thereof). The Si compound may be any alloy made from Si and an element other than Si, such as cobalt (Co), nickel (Ni), titanium (Ti), iron (Fe), or manganese (Mn); or any oxide of Si. The Si oxide is preferably a material represented by the following general composition formula: $SiO_x$ ($0.5 \leq x \leq 1.5$), which contains Si and oxygen (O), as constituent elements.

$SiO_x$ is not limited to $SiO_x$ containing only any oxide of Si, and may contain a microcrystalline phase or an amorphous phase of Si. Thus, examples of $SiO_x$ include $SiO_x$ having a structure in which Si (for example, microcrystalline Si) is dispersed in a microcrystalline phase of Si or a $SiO_2$ matrix of an amorphous phase. In this case, about the respective atomic proportions of Si and O, it is sufficient that x in a combination of $SiO_2$ of the amorphous phase with Si dispersed therein satisfies "$0.5 \leq x \leq 1.5$". For example, when the ratio by mole of $SiO_2$ to Si is 1:1 in the structure in which Si is dispersed in the $SiO_2$ matrix of the amorphous phase, the expression "x=1" is satisfied; thus, this structure is represented as SiO in the present invention. In such a structure, a peak originating from the presence of Si may not be observed by X-ray diffraction analysis. However, an observation thereof through a transmission electron microscope makes it possible to identify the presence of minute Si.

About the diameter of particles of $SiO_x$, the average particle diameter D50 thereof is preferably from 0.1 to 10 μm to heighten a complexing effect of $SiO_x$ with a carbon material that will be described below and further prevent the particles from being made minute and fine when the resultant secondary battery is charged or discharged. The value D50 is a value obtained by a laser diffraction/scattering type particle-size-analyzing method.

(2) Polymer

The negative electrode material according to the present invention is characterized by including, besides the Si based negative electrode active material(s), a polymer represented by the chemical formula (1). The Si based negative electrode active material(s) is/are preferably covered with the polymer from the viewpoint of an improvement in the cycle characteristic of the battery. In the case of mixing the Si based negative electrode active material(s) actually with the polymer by a method mentioned in item "Examples" that will be described later, almost all of the Si based negative electrode active material(s) would be covered with the polymer. However, it is allowable that the Si based negative electrode active material(s) is/are not completely covered. In other words, the present invention can produce the advantageous effect of the invention as far as the invention includes, as its negative electrode material, not only the above-mentioned Si based negative electrode active material(s) but also the polymer, which will be described below. The description, about the polymer represented by the chemical formula (1), will be made hereinafter.

Advantageous Effects of Amide Group (—CONH—) of A:

When A has an amide group, the polymer itself is heightened in electrolytic-solution-blocking performance. As a result, a battery using the Si based negative electrode active material(s) would be heightened in cycle characteristic.

Advantageous Effects of Sulfo Group (—$SO_3X$) of A:

When A has a sulfo group, the polymer can be heightened in lithium ion disassociating performance. As a result, the polymer gives an advantageous effect of lowering the resistance of the battery. Moreover, the sulfo group is considered to be a functional group low in affinity with the electrolytic solution. Thus, this group would restrain co-insertion of a solvent for the Si based negative electrode active material(s) to fulfill a role important for improving the cycle characteristic. In —$SO_3X$, X is an alkali metal or hydrogen (H). The alkali metal may be lithium (Li), sodium (Na), potassium (K), rubidium (Rb), cesium (Cs), or francium (Fr). From the viewpoint of performances of the battery, the alkali metal is preferably Li, Na or K, in particular preferably Li. This is because the selection of Si attains the formation of a solid electrolyte interface (SEI) on the surface of the negative electrode active material, the SEI being excellent in Li ion conductivity and high in electrolytic-solution-blocking performance.

Specific Example of A:

A specific example of A in the chemical formula (1) is a functional group represented by a chemical formula (2) illustrated below. In the chemical formula (2), $R^7$ and $R^8$ are each an alkyl group, or H. The alkyl group is preferably a methyl group from the viewpoint of stability. In the formula (2), $R^9$ is a methylene group (—($—CH_2—)_n—$) in which n is from 0 to 10 both inclusive. The symbol "n" is preferably from 1 to 5 both inclusive. In the formula (2), X is an alkali metal or H.

[Chem. 2]

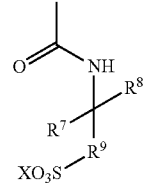

chemical formula (2)

About B:

The polymer in the present invention may be a polymer obtained by polymerizing a monomer containing A described above. The polymer may be a polymer obtained by copolymerizing the A-containing monomer with a different monomer (B-containing monomer). Through the copolymerization, the polymer related to the present invention produces a higher advantageous effect of improving the cycle characteristic.

It is preferred that B is a functional group containing a hydroxyl group, a carboxyl group, a sulfo group, an amino group, and/or a phosphate group. Preferred examples of the monomer to be copolymerized (B-containing monomer) include monomers containing structures represented by the following chemical formulae (3) to (6), respectively:

[Chem. 3]

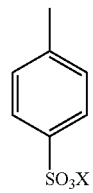

chemical formula (3)

[Chem. 4]

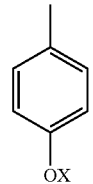

chemical formula (4)

[Chem. 5]

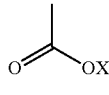

chemical formula (5)

[Chem. 6]

chemical formula (6)

In each of the chemical formulae (3) to (6), X is an alkali metal or H. The alkali metal is preferably Li or Na from the viewpoint of electrochemical stability. Among the chemical formulae (3) to (6), the chemical (3) is particularly preferred.

The use of the chemical formula (3) would make the polymer high in wettability to the negative electrode active material to improve the negative electrode active material in covering performance, and heighten the battery in cycle characteristic.

The polymer in the present invention may be a polymer obtained by mixing the A-containing monomer with the B-containing monomer to copolymerize the monomers with each other, or a polymer obtained by synthesizing an A-containing polymer and a B-containing polymer separately from each other beforehand, and then mixing the polymers with each other. The polymer obtained by the copolymerization is preferred from the viewpoint of the compatibility of the polymer.

Copolymer Composition Proportions:

In the present invention, the composition proportions in the copolymer of the chemical formula (1) are important for producing the advantageous effects of the present invention. The ratio of $x/(x+y)$ satisfies "$0<x/(x+y)\leq 1$", and is preferably "$0.4\leq x/(x+y)\leq 1$". The control of the ratio of $x/(x+y)$ makes it possible to provide a Li battery excellent in cycle characteristic.

In the present specification, the composition proportions in the copolymer are regarded as being equal to the respective composition proportions of the A-containing monomer and the B-containing monomer before the copolymerization.

Polymerization Method for Polymer:

The polymerization method of the A-containing monomer, and the copolymerization method of the A-containing monomer and the B-containing monomer are not each particularly limited, and may each be any method known in the prior art. Preferred examples of the methods include bulk polymerization, solution polymerization, emulsion polymerization, and radical polymerization. In the polymerization, a polymerization initiator may be used. A radical polymerization initiator is preferably used from the viewpoint of easiness of the handling thereof. A polymerization method using the radical polymerization initiator may be performed, using a temperature range and a polymerization period that are each ordinarily used. In the present invention, the blend proportion of the initiator is preferably from 0.1 to 20% by weight, more preferably from 0.3 to 5% by weight of the polymerizable compound(s).

Polymer Structure:

In the present invention, the structure of each of the A-containing polymer and the B-containing polymer may be a linear structure, a branched structure, a crosslinked structure, or a dendrimer structure. The polymer is preferably a polymer having a linear structure from the viewpoint of workability. The polymerization form obtained when the monomers are copolymerized with each other is not particularly limited as far as a polymer can be produced. Examples thereof include random copolymerization, alternating copolymerization, block copolymerization, and graft copolymerization.

Molecular Weight of Polymer:

The molecular weight of each of the A-containing polymer and the B-containing polymer does not particularly matter as far as the molecular weight permits the polymer to cover the negative electrode active material. From the viewpoint of workability, the number-average molecular weight thereof is preferably from 1,000 to 1,000,000 both inclusive.

Specific Example of Polymer:

The polymer obtained by copolymerizing the A-containing monomer with the B-containing monomer may be, for example, the following chemical formula (7):

[Chem. 7]

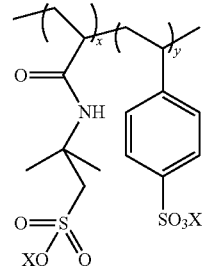

chemical formula (7)

(3) Carbon Material

The negative electrode material according to the present invention may further contain an electroconductive material for supplementing the electron conductivity of the negative electrode besides the Si based negative electrode active material(s) and the polymer. The electroconductive material is preferably a carbon material capable of occluding and releasing (chargeable and dischargeable) Li. The negative electrode active material and the carbon material are usable in the form of a complexed product or a mixture. Specific examples of the carbon material do not matter as far as the examples can occlude and release Li. From the viewpoint of electrochemical stability, the carbon material is preferably graphite, soft carbon, or amorphous carbon.

The complexed product of the negative electrode active material and the carbon material is preferably any $SiO_x$ carbon complex material ($SiO_xC$). The $SiO_xC$ is a material in which a silicon oxide forms a core material and a covering layer of a carbon material is formed on the surface of the core material.

Mix Form of Negative Electrode Active Material and Polymer (Covering Form of Negative Electrode Active Material with Polymer), and Mixing Method Thereof (Covering Method):

In the negative electrode material of the present invention, the mix form and the mixing method of the negative electrode active material are important. The form of the covering is classified as described in the following (a) to (d):

(i) Case of using only the Si based negative electrode active material(s):

a: the form that the Si based negative electrode active material(s) is/are covered with the polymer.

(ii) Case of using the Si based negative electrode active material(s) and the carbon material in a mixture form:

b: the form that the Si based negative electrode active material(s) is/are covered with the polymer and the resultant covered material(s) is/are mixed with the carbon material in a non-covered form;

c: the form that the Si based negative electrode active material(s) in a non-covered form is/are mixed with the carbon material covered with the polymer; and d: the form that the Si based negative electrode active material(s) is/are mixed with the carbon material to produce a mixture, and then the mixture is covered with the polymer.

In the cases "a" and "b", the covering amount proportion (the mixing amount proportion of the polymer to the Si based negative electrode active material(s)) is preferably more than 0%, and 10% or less by weight of the Si based negative electrode active material(s), more preferably from 0.1 to 5% both inclusive by weight thereof, in particular preferably from 0.3 to 3% both inclusive by weight thereof.

In the case "c", the amount proportion of the covering onto the carbon material (the mixing amount proportion of the polymer to the carbon material) is preferably more than 0%, and 10% or less by weight of the carbon material, more preferably from 0.1 to 5% both inclusive by weight thereof, in particular preferably from 0.3 to 3% both inclusive by weight thereof.

In the case "d", the covering amount proportion (the mixing amount proportion of the polymer to the mixture) is preferably more than 0%, and 10% or less by weight, more preferably from 0.1 to 5% both inclusive by weight, in particular preferably from 0.3 to 3% both inclusive by weight.

By adjusting the concentration (the mixing amount proportion or the covering amount proportion) of the covering material as described above, an SEI high in stability would be formed to improve the Li battery in cycle characteristic.

In the negative electrode material of the present invention, the mixing method (covering method) of the Si based negative electrode active material(s) with the polymer is important. The covering does not particularly matter as far as the Si based negative electrode active material(s) is/are covered with the polymer. From the viewpoint of costs, it is preferred to dissolve the polymer into a solvent, adding the Si based negative electrode active material(s) to the resultant solution, stirring them, and then drying the solvent to cover the material(s). The solvent does not particularly matter as far as the polymer is dissolved in the solvent. The solvent is preferably, for example, a protonic solvent such as water or ethanol, an aprotic solvent such as N-methylpyrrolidone, or a nonpolar solvent such as toluene or hexane.

Method for Checking Polymer in Negative Electrode Material:

The presence of the polymer represented by the chemical formula (1) can be checked by extracting the negative electrode material with water, and measuring the resultant liquid extract by 1H-NMR. In other words, according to 1H-NMR, about the polymer represented by the chemical formula (1), characteristic signals can be observed at 7 to 8 ppm, and 3 to 4 ppm, respectively; thus, using these signals as indexes, the presence of the polymer represented by the chemical formula (1) can be checked.

Binder:

In the present invention, the selection of the binder for the negative electrodes is important. Examples of the binder include polyvinylidene fluoride, polyolefin, polytetrafluoroethylene, styrene-butadiene rubber, polyamide, polyamideimide, and acrylic binders. Among these examples, polyvinylidene fluoride, polyamide, polyamideimide, and acrylic binders are preferred from the viewpoint of electrochemical stability. A combination is usable which is composed of one or more of these examples and a polysaccharide polymer such as a cellulose.

Power Collector:

The negative electrode power collector is not particularly limited. The collector may be, for example, a copper foil piece having a thickness of 10 to 100 μm, a perforated copper foil piece having a thickness of 10 to 100 μm and a pore diameter of 0.1 to 10 mm, an expanded metal, or a foamed copper plate. The material may be, for example, stainless steel, titanium or nickel besides copper.

The negative electrode 12 can be produced by: causing a negative electrode slurry in which a negative electrode material, a binder and an organic solvent are mixed with each other to adhere onto a power collector by, for example, a doctor blade, dipping or spraying method; drying the organic solvent; and then pressure-forming the resultant by roll pressing. Moreover, plural mixture layers can be stacked onto the power collector by performing a process from the coating to the drying plural times.

<Positive Electrodes>

Each of the positive electrodes 10 includes a positive electrode active material, an electroconductive agent, a binder, and a power collector. The positive electrode active material is not particularly limited. Preferred examples thereof include $LiCoO_2$, $LiNiO_2$, and $LiMn_2O_4$. Other examples thereof include $LiMnO_3$, $LiMn_2O_3$, $LiMnO_2$, $Li_4Mn_5O_{12}$, $LiMn_{2-x}M_xO_2$ wherein M=at least one selected from the group consisting of Co, Ni, Fe, Cr, Zn and Ti, and x=0.01 to 0.2, $Li_2Mn_3MO_8$ wherein M=at least one selected from the group consisting of Fe, Co, Ni, Cu and Zn, $Li_{1-x}A_xMn_2O_4$ wherein A=at least one selected from the group consisting of Mg, B, Al, Fe, Co, Ni, Cr, Zn and Ca, and x=0.01 to 0.1, $LiNi_{1-x}M_xO_2$ wherein M=at least one selected from the group consisting of Co, Fe and Ga, and x=0.01 to 0.2, $LiFeO_2$, $Fe_2(SO_4)_3$, $LiCo_{1-x}M_xO_2$ wherein M=at least one selected from the group consisting of Ni, Fe and Mn, and x=0.01 to 0.2, $LiNi_{1-x}M_xO_2$ wherein M=at least one selected from the group consisting of Mn, Fe, Co, Al, Ga, Ca and Mg, and x=0.01 to 0.2, $Fe(MoO_4)_3$, $FeF_3$, $LiFePO_4$, and $LiMnPO_4$.

The diameter of particles of the positive electrode active material is usually regulated into a value equal to or less than the thickness of a mixture layer formed from the positive electrode active material, the electroconductive agent and the binder. If powder of the positive electrode active material contains coarse particles having a size equal to or more than the thickness of the mixture layer, it is preferred to remove the coarse particles beforehand by, for example, sieve-classification or wind-flowing classification to produce particles having a size equal to or less than the thickness of the mixture layer.

The positive electrode active material is generally of an oxide type to be high in electrical resistance. Thus, the electroconductive agent is used which is made of carbon powder for supplementing the electrical conductivity of the positive electrode. Both of the positive electrode active material and the electroconductive agent are usually powdery; accordingly, the binder is mixed with the powders, and thus the powdery particles can be bounded to each other and simultaneously bonded to the power collector.

The power collector of the positive electrode 10 may be, for example, an aluminum foil piece having a thickness of 10 to 100 μm, a perforated aluminum foil piece having a thickness of 10 to 100 μm and a pore diameter of 0.1 to 10 mm, an expanded metal, or a foamed metallic plate. The material may be, for example, stainless steel or titanium besides aluminum. In the present invention, the power collector is not limited about the material, shape and producing method thereof, and may be any power collector.

The positive electrode 10 can be produced by: causing a positive electrode slurry in which a positive electrode active material, an electroconductive agent, a binder and an organic solvent are mixed with each other to adhere onto a power collector by, for example, a doctor blade, dipping or spraying method; drying the organic solvent; and then pressure-forming the resultant by roll pressing. Moreover, plural mixture layers can be stacked onto the power collector by performing a process from the coating to the drying plural times.

<Separators>

Any one of the separators 11 is inserted between each of the positive electrodes 10 and the corresponding negative electrode 12, which are each produced by the above-mentioned method, to prevent a short circuit between the positive electrode 10 and the negative electrode 12. The separator 11 may be, for example, a polyolefin polymer sheet made of polyethylene, polypropylene or some other polyolefin; or a bilayered structure in which a polyolefin polymer is melt-bonded to a sheet of a fluorine-containing polymer, a typical example thereof being polytetrafluoroethylene. In order that the separator 11 may not shrink when the battery temperature becomes high, a mixture of a ceramic material and a binder may be formed into a thin layer form on an each surface of the separator 11. The separator 11 needs to transmit lithium ions when the battery is charged and discharged. Thus, the separator 11 is usable in the lithium ion secondary battery when the separator generally has a pore diameter of 0.01 to 10 μm and a porosity of 20 to 90%.

<Electrolyte>

The electrolytic solution is, for example, a solution in which lithium hexafluorophosphate ($LiPF_6$) or lithium borofluoride ($LiBF_4$) is dissolved, as the electrolyte (support salt), into a solvent in which ethylene carbonate is blended with, for example, dimethyl carbonate, diethyl carbonate or ethylmethyl carbonate. The present invention is not limited about the kind of the solvent and the electrolyte, and the solvent blend ratio. Thus, a different electrolytic solution is also usable.

Examples of a nonaqueous solvent usable for the electrolytic solution include propylene carbonate, ethylene carbonate, butylene carbonate, vinylene carbonate, fluoroethylene carbonate, γ-butyrolactone, dimethyl carbonate, diethyl carbonate, methyl ethyl carbonate, 1,2-dimethoxyethane, 2-methyltetrahydrofuran, dimethylsulfoxide, 1,3-dioxolane, formamide, dimethylformamide, methyl propionate, ethyl propionate, phosphoric acid triester, trimethoxymethane, dioxolane, diethyl ether, sulfolane, 3-methyl-2-oxazolidinone, tetrahydrofuran, 1,2-diethoxyethane, chloroethylene carbonate, chloropropylene carbonate, and other nonaqueous solvents. A solvent different from these examples may be used as far as the solvent is not decomposed on the positive electrodes 10 or the negative electrodes 12 built in the battery of the present invention.

Examples of the electrolyte include $LiPF_6$, $LiBF_4$, $LiClO_4$, $LiCF_3SO_3$, $LiCF_3CO_2$, $LiAsF_6$, $LiSbF_6$, imide salts of lithium, a typical example thereof being lithium trifluoromethanesulfonimide, and many lithium salt species. A nonaqueous electrolytic solution produced by dissolving one or more of these salts into the above-mentioned solvent is usable as the electrolytic solution for the battery. A solvent different from these electrolytes may be used as far as the solvent is neither decomposed on the positive electrodes 10 nor the negative electrodes 12 that the battery according to the present embodiment has.

When a solid polymer electrolyte (polymer electrolyte) is used, this used electrolyte may be an ion conductive polymer such as polyethylene oxide, polyacrylonitrile, polyvinylidene fluoride, polymethyl methacrylate, polyhexafluoropropylene, or polyethylene oxide. When these solid polymer electrolytes are used, an advantage is produced that the separators 11 can be omitted.

Furthermore, an ionic liquid is usable. The following is usable for the battery according to the present embodiment: a combination that is neither decomposed by the positive electrodes 10 nor the negative electrodes 12 and that is selected from, for example, 1-ethyl-3-methylimidazolium tetrafluoroborate ($EMI-BF_4$); a mixed complex composed of a lithium salt, $LiN(SO_2CF_3)_2$ (LiTFSI), triglyme and tetraglyme; cyclic quaternary ammonium type cations (an example thereof being N-methyl-N-propylpyrrolidinium), and imide type anions (an example thereof being bis(fluorosulfonyl)imide).

<Battery System>

A Li battery in which the negative electrode material of the present invention is used has properties high in capacity and excellent in cycle characteristic. Thus, the Li battery is suitable for small-sized batteries for portable instruments, and large-sized batteries for being mounted in cars.

EXAMPLES

Hereinafter, the present invention will be more specifically described by way of working examples thereof. However, the invention is not limited to these examples.

Production of Lithium Ion Secondary Batteries of Examples 1 to 7, Reference Example 1, and Comparative Examples 1 and 2

(1) Polymer Production

A predetermined amount or respective predetermined amounts of a monomer I represented by a chemical formula (8) illustrated below (A-containing monomer in the chemical formula (1)) and/or a monomer II represented by a chemical formula (9) illustrated below (B-containing monomer in the chemical formula (1)) was/were charged into a reactor. Water was added thereto as a reaction solvent. Furthermore, AIBN (2,2'-azobis(isobutyronitrile)) was added to the solution as a polymerization initiator. The addition was made to adjust the concentration of the polymerization initiator to 4% by weight of the whole of the monomers. Thereafter, the reaction solution was heated at 60° C. for 3 hours to synthesize each polymer (copolymer made from the monomer I and the monomer II). About each of Examples 1 to 7, Reference Example 1, and Comparative Examples 1 and 2, Table 1 described below shows the proportion x (% by mole) of the monomer I and the proportion y (% by mole) of the monomer II in the copolymer.

[Chem. 8]

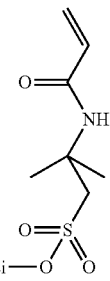

chemical formula (8)

[Chem. 9]

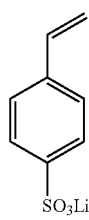

chemical formula (9)

(2) Mixing of Negative Electrode Active Material with Polymer (Covering of Negative Electrode Active Material with Polymer)

As a negative electrode active material, a mixture was used in which a SiOC was mixed with a chargeable and dischargeable carbon material (natural graphite) C. This mixture was mixed with the polymer prepared as described above. In the SiOC, the proportion of the amount of carbon complexed into SiO was set to 10% by weight. The form of the mixing (covering) was rendered one of the following forms "a" to "d":

The form "a" was such a form that the SiOC was covered with the polymer. The covering amount proportion (the mixing amount proportion of the polymer to the negative electrode active material) was set to 0.5% by weight of the SiOC. The form "b" was such a form composed of the SiOC and natural graphite that the SiOC was covered with the polymer and then the resultant was mixed with natural graphite. The covering amount proportion of the polymer was set to 0.5% by weight of the SiOC. The ratio by weight between the covered SiOC and natural graphite was 1:9. The form "c" was such a form composed of the SiOC and natural graphite that natural graphite was covered with the polymer and then the resultant was mixed with the SiOC. The covering amount proportion of the polymer was set to 0.5% by weight of the SiOC. The ratio by weight between the SiOC and the covered natural graphite was 1:9. The form "d" was such a form composed of the SiOC and natural graphite that the SiOC and natural graphite were mixed with each other at a ratio by weight of 1:9 to produce a mixture, and then the mixture was covered with the polymer. The covering amount proportion of the polymer was set to 0.5% by weight of the SiOC.

The covering of the negative electrode active material with the polymer was attained by producing an aqueous solution of the polymer, adding the negative electrode active material thereto, stirring the resultant, and then removing water therefrom. Table 1 described below also shows the covering form in each of Examples 1 to 7, Reference Example 1, and Comparative Examples 1 and 2.

(3) Negative Electrode Production

About negative electrodes, a negative electrode active material and polyvinylidene fluoride were mixed with each other at a ratio by weight percent of 95 to 5, and further the resultant was charged into N-methyl-2-pyrrolidone to mix the individual components with each other. In this way, a slurry-form solution was produced. A doctor blade method was used to apply this slurry onto a copper foil piece having a thickness of 10 μm, and the resultant was dried. Thereafter, the resultant negative electrode was pressed to yield negative electrodes for evaluation.

(4) Positive Electrode Production

A positive electrode active material (LiCoO$_2$), an electroconductive agent (SP270: graphite, manufactured by Nippon Graphite Industries, Ltd.), and a polyvinylidene fluoride binder were mixed with each other at a ratio by weight percent of 85:7.5:7.5. The mixture was charged into N-methyl-2-pyrrolidone to mix the individual components with each other. In this way, a slurry-form solution was produced. A doctor blade method was used to apply this slurry onto an aluminum foil piece having a thickness of 20 μm, and the resultant was dried. The applied amount of the mixture was 200 g/m$^2$. Thereafter, the resultant was pressed to produce positive electrodes.

(5) Production and Initialization of 18650 Battery

A separator was sandwiched between each of the positive electrodes and each of the negative electrodes, and the resultant was wound. The wound body was put into a battery can, and further an electrolytic solution was added thereto. Thereafter, the resultant was sealed to yield a 18650 battery. Thereafter, the battery was charged and discharged. A cycle of the charging and the discharging was repeated three times to initialize the battery. The range for the charging and the discharging was a range from 2.7 to 4.1 V.

(6) Evaluation of Cycle Characteristic of 18650 Battery

The voltage range was set into a range from 2.7 to 4.1 V to repeat the charging and the discharging of the battery. The current value thereof in the charging and the discharging was 1000 mA. About the cycle characteristic thereof, the capacity at the 1st cycle and that at the 50th cycle were measured, and then the following was calculated out: "the capacity at the 50th cycle"/"that at the 1th cycle"×100(%). The resultant value was defined as the capacitor retention of the battery. The evaluation results are also shown in Table 1.

TABLE 1

Structure and evaluation results of each of Examples 1 to 7, Reference Example 1, and Comparative Examples 1 & 2

| | Polymer composition (% by mole) | | | Negative electrode active material | Covering form | Cycle characteristic |
|---|---|---|---|---|---|---|
| | x | y | x/(x + y) | | | |
| Example 1 | 100 | 0 | 1 | SiOC | a | 70.8 |
| Example 2 | 100 | 0 | 1 | SiOC + C | b | 85 |
| Example 3 | 100 | 0 | 1 | SiOC + C | c | 80.1 |
| Example 4 | 100 | 0 | 1 | SiOC + C | d | 86.2 |
| Example 5 | 75 | 25 | 0.75 | SiOC + C | d | 87.9 |
| Example 6 | 50 | 50 | 0.5 | SiOC + C | d | 85 |
| Example 7 | 25 | 75 | 0.25 | SiOC + C | d | 84 |
| Reference example 1 | 0 | 100 | 0 | SiOC + C | d | 80.1 |
| Comparative example 1 | — | — | — | SiOC | — | 63.1 |
| Comparative example 2 | — | — | — | SiOC + C | — | 68.1 |

As shown in Table 1, Examples 1 to 7, in each of which the negative electrode material according to the present invention was used, showed a cycle characteristic higher than Comparative Examples 1 and 2. Examples 5 and 6 (the composition proportions in the polymer satisfied "0.4≤x/(x+y)≤1", and the covering form was the form "d") showed an especially high cycle characteristic.

Reference Example 1 was an example in which only the monomer II was used for its polymer. A negative electrode material using the monomer II is not known as a negative electrode material. However, the composition ratio (x/(x+y)) in the polymer do not satisfy the regulation specified in the present invention. Thus, this example has been described as "Reference Example" to show the importance of the composition ratio, or composition proportions in the polymer. When only the monomer II was used, Reference Example 1 was higher in cycle characteristic than Comparative Examples 1 and 2. However, Reference Example 1 showed a cycle characteristic value lower when compared with Examples 4 to 7, each of which was in the same covering form "d" as Reference Example 1. It can be considered that this is because the monomer II is higher in resistance than the monomer I.

When Examples 1 to 4 are compared with each other, the covering form "d" showed the highest cycle characteristic. When Examples 4 to 7 are compared with each other, the batteries in each of which the monomers I and II were copolymerized with each other showed a higher cycle characteristic than the battery in which only the monomer I was polymerized.

As described above, it has been verified that the present invention makes it possible to provide a novel negative electrode material for lithium ion secondary batteries that has a high Li ion conductivity and improves the lithium ion secondary batteries in cycle characteristic.

The above-mentioned embodiments and working examples are ones described to assist the understanding of the present invention. Thus, the invention is not limited to only the described specific configurations. For example, the configuration of any one of the examples can be partially replaced by the configuration of any different one of the examples. Furthermore, to the configuration of any one of the examples may be added the configuration of any different one of the examples. In other words, about the present invention, the configuration of any one of the embodiments and the working examples in the present specification may be partially subjected to deletion, the replacement of a different configuration, or the addition of a different configuration.

REFERENCE SIGNS LIST

1: battery, 10: positive electrode, 11: separator, 12: negative electrode, 13: battery container (battery can), 14: positive electrode power-collecting tab, 15: negative electrode power-collecting tab, 16: internal lid, 17: internal pressure releasing valve, 18: gasket, 19: positive temperature coefficient (PTC) resistor, 20: battery lid, and 21: axial core.

The invention claimed is:

1. A negative electrode material for lithium ion secondary batteries, comprising:
    a negative electrode active material that includes a silicon compound having average particle diameter D50 from 0.1 to 10 μm;
    a carbon material that supplements electron conductivity of the negative electrode active material; and
    a polymer in a mixing amount proportion of between 0.1% to 5% by weight to the carbon material, wherein the polymer is represented by the following chemical formula (1):

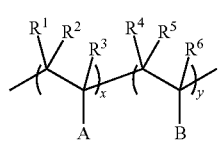

chemical formula (1)

wherein A is a functional group having an amide group (—CONH—) and a sulfo group (—SO$_3$ X wherein X represents an alkali metal or hydrogen (H));

B is a functional group having a polar functional group and is represented by the following chemical formula (3); and $R^1$ to $R^6$ are each a hydrocarbon group having 1 to 10 carbon atoms or hydrogen (H); x and y are composition proportions in the polymer that is a copolymer, and satisfy the following: $0 < x/(x+y) \leq 1$

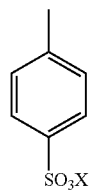

chemical formula (3)

wherein X is an alkali metal or hydrogen (H).

2. The negative electrode material for lithium ion secondary batteries according to claim 1, wherein the negative electrode active material is covered with the polymer.

3. The negative electrode material for lithium ion secondary batteries according to claim 1, wherein A of the polymer is represented by the following chemical formula (2):

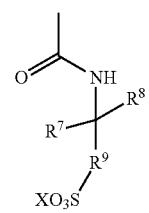

chemical formula (2)

wherein $R^7$ and $R^8$ are each an alkyl group having 1 to 10 carbon atoms, or hydrogen (H); $R^9$ is a methylene group (—(—CH$_2$—)$_n$—) wherein n is a number from 0 to 10 both inclusive; and X is an alkali metal or hydrogen (H).

4. The negative electrode material for lithium ion secondary batteries according to claim 1, wherein the composition proportions in the copolymer satisfy the following: $0.4 \leq x/(x+y) \leq 1$.

5. The negative electrode material for lithium ion secondary batteries according to claim 1, wherein the silicon compound is a silicon oxide, or a compound of silicon and an element other than silicon.

6. The negative electrode material for lithium ion secondary batteries according to claim 1, further comprising a carbon material.

7. The negative electrode material for lithium ion secondary batteries according to claim 1, wherein the silicon compound is a silicon oxide, the silicon oxide forms a core material, and a covering layer of the carbon material is formed over a surface of the core material.

8. A negative electrode for lithium ion secondary batteries, the negative electrode comprising: the negative electrode active material according to claim 1;
    a binder; and
    a power collector.

9. The negative electrode for lithium ion secondary batteries according to claim 8, wherein the negative electrode active material is covered with the polymer.

10. A lithium ion secondary battery, comprising:
    a positive electrode;
    the negative electrode according to claim 8; and
    a nonaqueous electrolytic solution comprising a nonaqueous solvent and a support salt.

11. The lithium ion secondary battery according to claim 10, wherein the negative electrode active material is covered with the polymer.

12. A battery system, wherein the lithium ion secondary battery recited in claim 10 is used.

13. The negative electrode material according to claim 1, wherein the mixing amount proportion of the polymer to the carbon material is between 0.3% to 3% by weight.

14. A negative electrode material for lithium ion secondary batteries, comprising:
- a negative electrode active material that includes a silicon compound having average particle diameter D50 from 0.1 to 10 μm;
- a carbon material that supplements electron conductivity of the negative electrode active material; and
- a polymer in a mixing amount proportion of between 0.1% to 5% by weight to a mixture of the carbon material and the negative electrode active material, wherein the polymer is represented by the following chemical formula (1):

chemical formula (1)

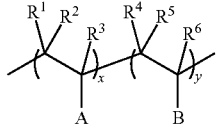

wherein A is a functional group having an amide group (—CONH—) and a sulfo group (—SO$_3$ X wherein X represents an alkali metal or hydrogen (H));

B is a functional group having a polar functional group and is represented by the following chemical formula (3); and R$^1$ to R$^6$ are each a hydrocarbon group having 1 to 10 carbon atoms or hydrogen (H); x and y are composition proportions in the polymer that is a copolymer, and satisfy the following: 0<x/(x+y)≤1 chemical formula (3)

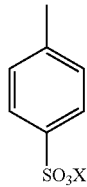

wherein X is an alkali metal or hydrogen (H).

15. The negative electrode material according to claim 14, wherein the mixing amount proportion of the polymer to the mixture is between 0.3% to 3% by weight.

* * * * *